United States Patent [19]
Kim et al.

[11] Patent Number: 5,299,295
[45] Date of Patent: Mar. 29, 1994

[54] METHOD AND APPARATUS FOR ELECTRONICALLY VIEWING, PRINTING, AND REGISTERING CHECKS

[75] Inventors: Donald Y. Kim, Berkeley; Crispian Soo; Jon Kim, both of Fremont, all of Calif.

[73] Assignee: Balenz, Inc., Fremont, Calif.

[21] Appl. No.: 667,570

[22] Filed: Mar. 12, 1991

[51] Int. Cl.⁵ ............................................. G06F 15/00
[52] U.S. Cl. ..................................... 395/111; 395/117
[58] Field of Search ...................... 395/101, 117, 111; 364/406, 408, 705.02; 400/62, 63, 279

[56] References Cited

U.S. PATENT DOCUMENTS

| | | | |
|---|---|---|---|
| 3,920,979 | 11/1975 | Kilby et al. | 364/708.02 |
| 4,053,735 | 10/1977 | Foudos | 395/101 |
| 4,134,537 | 1/1979 | Glaser | 395/101 |
| 4,222,109 | 9/1980 | Siwula | 395/101 |
| 4,308,588 | 12/1981 | Siwula | 395/101 |
| 4,403,301 | 9/1983 | Fessel | 395/101 |
| 4,459,052 | 7/1984 | Lundblad | 395/101 |
| 4,463,939 | 8/1984 | Watanabe | 395/101 |
| 4,465,192 | 8/1984 | Ohba et al. | 395/101 |
| 4,513,393 | 4/1985 | Edlund et al. | 395/101 |
| 4,623,965 | 11/1986 | Wing | 395/101 |

Primary Examiner—Arthur G. Evans
Attorney, Agent, or Firm—Townsend and Townsend, Khourie and Crew

[57] ABSTRACT

An electronic calculator for viewing, printing, and registering checks includes a base member for storing a plurality of checks, a data entry assembly for entering alpha-numeric data into the checkbook, a display screen for visually displaying the entered data. The electronic checkbook also includes a printing assembly having a mobile print head for printing check information on the face of an individual check. A check feed mechanism feeds individual checks to be printed past the print means and operates in conjunction with the print means so that, as each individual check is fed past the print means, the print means concomitantly prints data on the face of the check. A microprocessor electrically communicates with the data entry assembly, the printing assembly, and the check feed mechanism to process the entered data and to cooperatively drive the print head and the check feed mechanism to produce alpha-numeric printed matter on the face of the check.

21 Claims, 3 Drawing Sheets

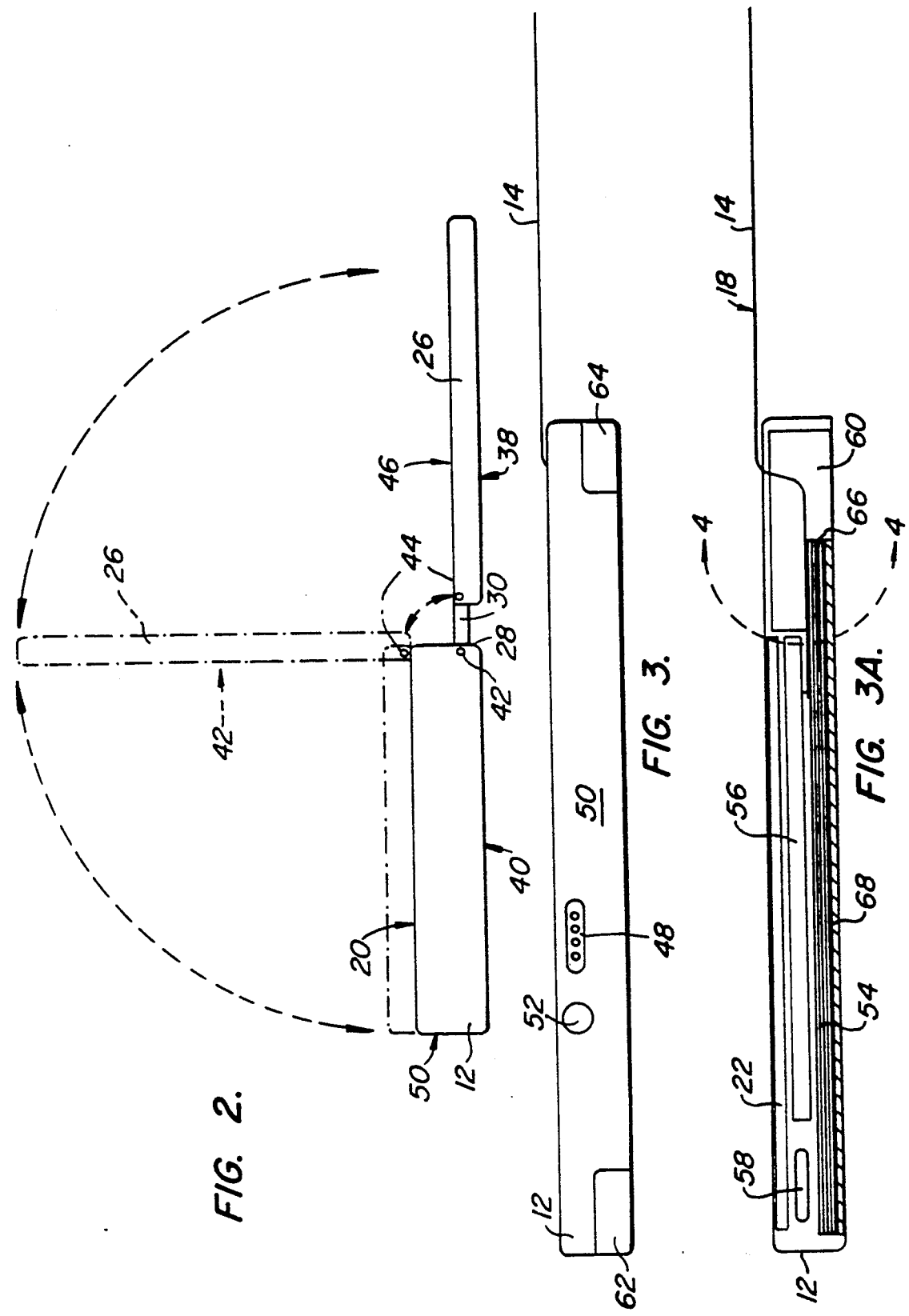

METHOD AND APPARATUS FOR ELECTRONICALLY VIEWING, PRINTING, AND REGISTERING CHECKS

FIELD OF THE INVENTION

This invention relates to a novel method and apparatus for automatically writing checks. More specifically, this invention relates to a method and apparatus for electronically viewing, printing, and registering checks.

BACKGROUND OF THE INVENTION

Currently, most individuals write checks and enter account balance information into their checkbooks by hand. Manually recording check transactions and writing checks is somewhat time consuming, and, for the elderly, often cumbersome. When hurried, individuals often enter a series of disbursed checks in the check registry without calculating the checking account balance. As a result, a current checking account balance is not always readily available, which increases the likelihood of overdrawing the checking account. Moreover, addition and subtraction mistakes are commonly made when balancing the checkbook, particularly if the checkbook is balanced rapidly. Miscalculations may, again, result in an overdrawn account, and these errors also lengthen the amount of time it takes to balance the checkbook figure with monthly bank statements.

In an attempt to alleviate the above-described problems, an electronic checkbook was designed which includes a microprocessor mounted in the checkbook folder. The microprocessor electronically calculates and stores the checking account balance on a day-to-day basis. The electronic checkbook includes a series of user-activated buttons to allow a user to input data, such as a debit or deposit amount, into the microprocessor. A digital display is provided for displaying entered data and the updated account balance calculated by the microprocessor, thereby eliminating the need for a check issuer to mentally calculate the checking account balance. This electronic calculator, however, still required individuals to handwrite checks. Handwriting checks can be a tedious process, particularly when paying monthly bills or in any other instance requiring issuance of a large number of checks.

In the more recent past, a computerized check writing apparatus has been developed which maintains, prints, and records deposits and withdrawals from a checking account. The check writing apparatus includes a rectangular box-like housing for receiving a check cartridge which carries a plurality of stacked checks. A plotting mechanism is carried on shafts mounted within the housing to horizontally and vertically position the print head relative to the face of a check to be printed. The print mechanism prints the date, name of payee, and check amount on the face of a check, and then an ejector mechanism ejects the check from the check cartridge for signature. Although the check issuer does not have to handwrite the check, printing the check is time and energy consuming because the print head of the print mechanism must operably travel along two axes to correctly plot the data onto the face of the check. In hurried circumstances, such as supermarket or grocery store lines, waiting for a check to be printed and then ejected from the check cassette may be frustrating.

The difficulties suggested in the preceding are not intended to be exhaustive but rather are among many which tend to reduce the effectiveness of prior electronic checkbook devices. Other noteworthy problems may also exist; however, those presented above should be sufficient to demonstrate that such electronic checkbooks appearing in the past will admit to worthwhile and substantial improvement.

Accordingly, it is therefore a general object of the invention to provide an electronic checkbook which will obviate or minimize difficulties of the type previously described and alluded to and referred to.

It is a specific object of the invention to provide an electronic checkbook which expeditiously and efficiently prints checks for disbursement.

It is another object of the invention to provide an electronic checkbook which calculates and stores account balance information, including information relating to disbursed checks, and visually display the stored information for future data retrieval.

It is still another object of the invention to provide an electronic checkbook which permits visual verification of entered data prior to printing a check It is a further object of the invention to provide an electronic checkbook which may be programmed for selective access by particular check issuers.

It is yet a further object of the invention to provide an electronic checkbook which may electronically communicate with external computer circuitry by receiving and transfering data.

It is still yet a further object of the invention to provide an electronic calculator which is portable, compact, durable, lightweight, easy to use, and energy efficient.

DISCLOSURE OF THE INVENTION

A preferred embodiment of the invention which is intended to accomplish at least some of the foregoing objects includes a base member for storing a plurality of checks. A slot is fashioned in the base member for permitting exit of individual checks from the subject electronic checkbook. The subject electronic checkbook also includes a data entry means for entering alpha-numeric data into the checkbook and a display means for visually displaying the entered data.

A print means prints check information data on the face of an individual check stored in the base member. The print means includes a mobile print head moveable in a direction transverse to the face of an individual check to be printed. A check feed mechanism feeds individual checks to be printed past the print means and operates in conjunction with the print means so that, as each individual check is fed past the print means, the print means concomitantly prints data on the face of the check. A microprocessor electrically communicates with the data entry means, the print means, and the check feed mechanism to process the entered data and to cooperatively drive the print head and the check feed mechanism to produce alpha-numeric printed matter on the face of the check.

In another aspect of the invention, the display means includes an LCD screen dimensioned to display a variety of menu options and prompts, as well as a full check face format for permitting simultaneous visual verification of the entered check information data for any single check.

An associated method for electronically viewing, printing, and registering checks includes the steps of storing a plurality of check blanks within a container;

entering data to be imprinted upon a single check blank into a data entry means; visually verifying the entered data on a screen dimensioned to display a full check blank format; registering the entered data for subsequent retrieval; printing alpha-numeric data on one of the check blanks; and simultaneously with said printing step, ejecting the printed check form the container.

BRIEF DESCRIPTION OF THE DRAWINGS

Other objects and advantages of the present invention will become apparent from the following detailed description of a preferred embodiment thereof taken in conjunction with the accompanying drawings, wherein:

FIG. 2 is a side elevation view of the subject electronic checkbook shown in FIG. 1 disclosing, in phantom, pivotal motion of the electronic checkbook monitor;

FIG. 3 is a front elevation view of the subject invention, as taken along line 3—3 in FIG. 1;

FIG. 3A is a cross-sectional view of the subject invention, as taken along line 3A—3A in FIG. 1;

BEST MODE OF CARRYING OUT THE INVENTION

Figure 1:
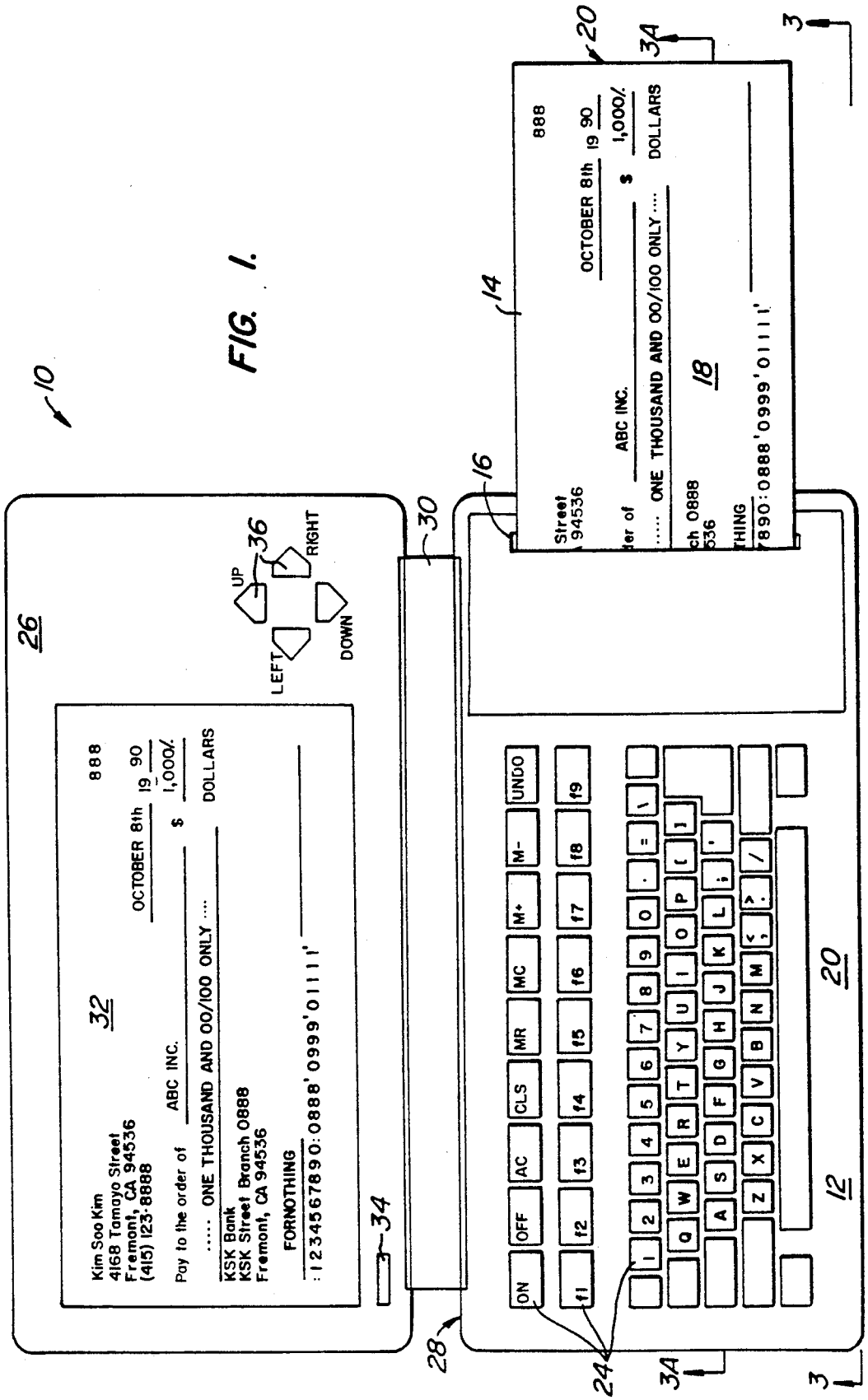
FIG. 1 is a plan view of the subject electronic checkbook in an open operative position in accordance with a preferred embodiment of the subject invention.

Referring now to the drawings, wherein like numerals indicate like parts, and initially to FIG. 1, there will be seen an electronic checkbook, generally indicated 10, for electronically viewing, printing, and registering checks in accordance with a preferred embodiment of the subject invention. Electronic checkbook 10 includes a generally rectangular, box-like base member 12 configured to store a plurality of standard-sized checks in a stacked arrangement. Base member 12 preferably has a height dimension which will easily accommodate twenty-five checks of standard thickness. The overall dimensional configuration of electronic checkbook 10 is essentially the same as a conventional checkbook for easy portability. In addition, electronic calculator 10 is constructed from a lightweight, durable material.

In FIG. 1, a printed check 14 is shown partially extending through a slot 16 in base member 12. As the appropriate check information is printed on check face 18, the leading edge 20 of printed check 16 is ejected from base member 12 through slot 16. Here, slot 14 is located on a upper surface 20 of base member 12; however, in alternative embodiments, slot 14 may be positioned on the lower surface or a side surface of base member 12.

An alpha-numeric keyboard 22 is mounted to upper surface 20 of base member 12. Keyboard 22 may include either a pressure-sensitive or heat-sensitive touch key pad or a raised-button key pad. In addition to alpha-numeric keys, keyboard 22 includes function keys, ON and OFF keys, and keys found on standard calculators, such as memory and clear. Information to be printed on a check, including the date, the name of payee, the check amount, and a memo message, may be entered into electronic checkbook 10 by depressing the appropriate keys 24 of keyboard 22. In a similar manner, a user may enter deposit amounts, withdrawal amounts, saving account information, and any additional account figures into electronic calculator 10. A user may also program an alarm setting into electronic calculator 10 by depressing a series of alarm control keys.

A monitor 26 is pivotally connected to side 28 of base 12 by a generally rectangular link member 30. Link member 30 permits monitor 26 to pivot and rotate about side 28 between the operative open position shown in FIG. 1 and a completely closed position, as will be described in more detail in connection with FIG. 2. Monitor 26 includes a display screen 32 for visually displaying data entered into keyboard 22 and a contrast control knob 34 to control the brightness of screen 32. Display screen 32, which preferably is an LCD (liquid crystal display) screen, is dimensioned to depict a full check face format for permitting a check issuer to visually verify that the check information data for any single check was entered correctly. A series of prompt messages and menus may also be displayed on screen 32 to assist a user with the operation of electronic checkbook 10. Monitor 26 also includes direction keys 36 for positioning a cursor on display screen 32 to, for example, correct or revise displayed data or choose options from program menus.

In an open operative position, a back surface 38 of monitor 26 is substantially coplanar with a bottom surface 40 of base member 12. Thus, electronic checkbook 10 may be placed open upon a horizontal or level surface, such as a table, to facilitate depressing cursor control keys 36 and keys on keyboard 22.

As shown in FIG. 2, monitor 26 may pivot and rotate about side 28 of base member 12, as indicated by the arrows. More specifically, rectangular link member 30 has a first end connected to a lower portion of side 28 by pin 42. Monitor 26 may rotate approximately ninety degrees about pin 42 from the operative open position, shown in solid lines, to a generally perpendicular position with respect to base member 12, as shown in phantom. In order to close electronic checkbook 10, monitor 26 may be rotated about pin 44 which connects a second end of link member 30 to monitor 26. Monitor 26 rotates approximately ninety degrees about pin 44 so that the screen face 46 of monitor 26 is flush with upper surface 20 of base member 12 in a closed position, as shown in phantom. The combination of link member 30 and pins 38 and 40 provide a compound pivot connection between base member 12 and monitor 26. Although the above-described compound pivot connection is desirable, a hinged assembly or other pivotal connection may be substituted for the compound pivot connection without departing from the scope of the subject invention.

Referring now to FIG. 3, a communication port 48 is positioned on a front surface 50 of base member 12 for permitting electronic communication between electronic checkbook 10 and external computer circuitry. Information from a personal computer or other computer system may be transferred to and from electronic checkbook 10 via communication port 48. Alternatively, data stored in electronic checkbook 10 may be uploaded to an external computer source, printer, or other computer peripheral.

A microphone 52 is also shown on front surface 50. The microphone 52 detects audio signals to provide voiced access to electronic calculator 10. In this manner, a blind person or a person unable to depress keys on keyboard 22 may input data into electronic calculator 10 to print checks or enter account balance information, as well as to control other operations of checkbook 10. In addition, microphone 52 may electrically communicate with voice recognition circuitry to provide a security check for entering or obtaining data from electronic checkbook 10.

As shown in FIG. 3A, base member 12 houses a stack of individual blank checks 54, keyboard 22, a central processing unit 56, a power supply 58 for the CPU, and printer assembly 60. The CPU 56 is electrically connected to keyboard 22 and printer assembly 60 to receive, store, and retrieve data entered into keyboard 22 and to drive printer assembly 60 to produce alphanumeric printed matter on the face 18 of check 14. In addition, CPU 56 electronically communicates with ROM storage, which stores the system program and instructions, and RAM storage, which stores data entered by a user. The CPU is also electrically coupled to a check feed mechanism, which will be described in more detail in conjunction with FIGS. 4 and 5.

Turning back to FIG. 3, a pair of cover plates 62 and 64 are releasably attached to either side of base member 12. Cover plate 62 may be removed to slidably insert a stack of checks 54 into base member 12 to abut against a vertical wall surface 66. The stack of checks 54 rests atop a vertically displaceable plate 68 which is biased upward with respect to bottom side 40 of base member 12 by a compression spring mounted between plate 68 and bottom surface 40.

In FIGS. 3 and 3A, a single check 14 is shown longitudinally displaced from stack of checks 54 an partially extending through slot 16 in base member 12. As the check exits base member 12, check 14 is threaded through printer assembly 60 which prints information on the face of the check. A printer assembly which is suitable for adaptation to the subject electronic checkbook 10 is Alps Printer Model No. PTMFL71028.

Figure 4:
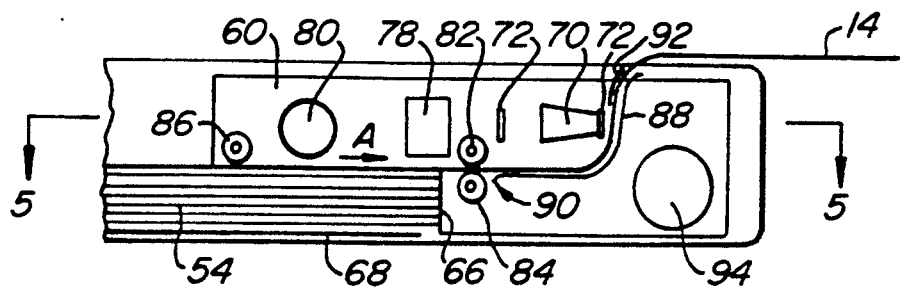
FIG. 4 is a partial detail view, in cross-section, of the area bounded by line 4—4 in FIG. 3A.
Figure 5:
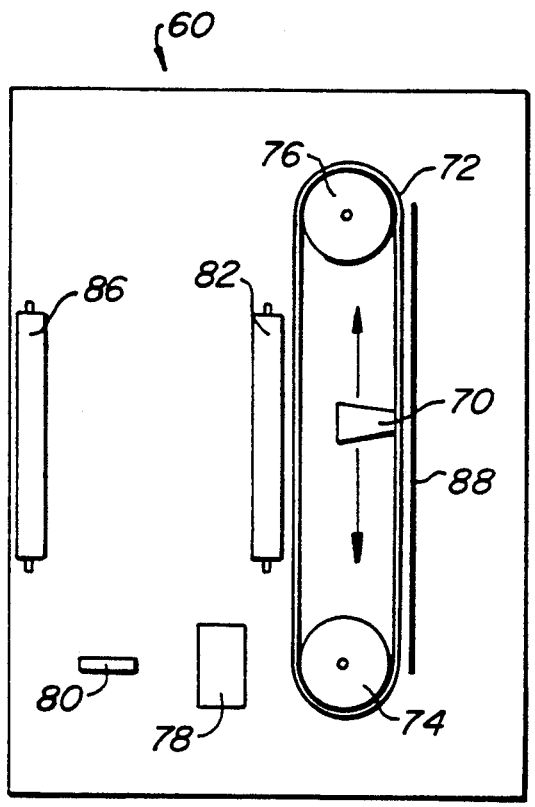
FIG. 5 is a cross-sectional view, as taken along line 5—5 in FIG. 4.

Focusing on FIGS. 4 and 5, printer assembly 60 includes a moveable print head 70 which operably travels in a direction transverse to the face of check 14, as indicated by the arrows of FIG. 5. Print head 70 is positioned for intermittent engagement with carbon print ribbon 72 which is trained around a pair of rotatable pulleys 74 and 76. Printer assembly 60 also includes a print motor 78, which controls movement of print head 70, and a drive motor 80, which controls movement of a check feed mechanism. Print motor 78 and drive motor 80 are, in turn, controlled by CPU 56 which cooperatively activate the motors to drive print head 70 and check feed mechanism so that, as check 14 is being fed past print head 70, print head 70 concomitantly prints data on the face of the check.

Check feed mechanism includes a drive roller 82 mounted transversely within base member 12 and an idler roller 84 positioned opposite drive roller 82. Drive roller 82 and idler roller 84 pinch the leading edge of check 14 to draw check 14 from stack of checks 54 for controlled advancement of check 14 with respect to print head 70. The check feed mechanism also includes a check advancement roller 86 which is mounted transversely in base member 12. Check advancement roller 86 operably pushes a check to be printed from stack of checks 54 in the direction of arrow A to be engaged by drive roller 82 and idler roller 84. Check advancement roller 78 is composed of a material, such as rubber, having a high coefficient of friction with respect to check 68 so that rotation of roller 78 produces movement of check 68.

Here, printer assembly 60 and the check feed mechanism are arranged to push check 14 the length of base member 12, and print head 70 traverses the width of check 14. However, in an alternative embodiment, printer assembly 60 and the check feed mechanism may be oriented within base member 12 so that print head 70 traverses the length of the check and the check is ejected through a long side of generally rectangular base member 12.

The check feed mechanism further includes a curved strike plate 88 having a downwardly extending lip 90 which receives leading edge 20 of check 14. Strike plate 88 is configured in a substantially S-shape to support and guide check 14 past print head 70. As check 14 is fed past print head 70, print head 100 travels along print ribbon 72 to concomitantly print the previously input check information on the face of the check. A guide plate 92 is positioned opposite a section of strike plate 88 to effectively guide check 14 toward slot 16 in base member 12. Once the trailing edge of check 14 leaves drive roller 82, print head 70 retracts to an inoperative position, and check 14 may be manually withdrawn from base member 12 through slot 16. As each check is printed and withdrawn from base member 12, plate 68 is displaced upward to place the topmost check in contact with check advancement roller 86. Power is supplied to printer assembly 60 by power supply 94 which may be accessed through cover plate 64.

Figure 6:
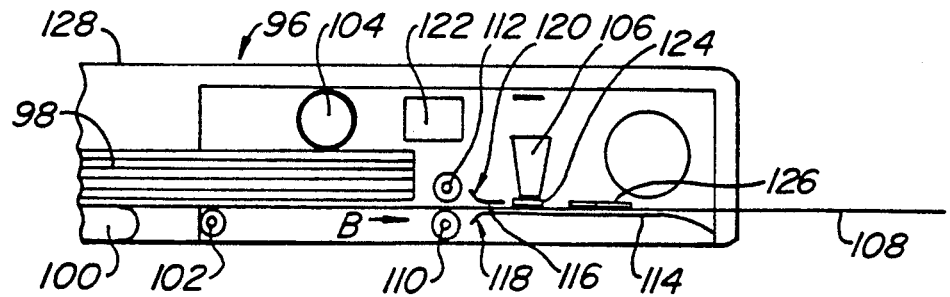
FIG. 6 is a partial detail view of an alternative embodiment of the area of the subject invention corresponding to FIG. 4.

FIG. 6 illustrates an alternative embodiment of the printer assembly, generally indicated 96, of the subject electronic checkbook 10. Here, stack of checks 98 is supported on a stationary flat plate 100. Check advancement roller 102, which is controlled by drive motor 104, propels the lowermost check from stack of checks 98 toward print head 106. As check 108 is propelled horizontally forward in the direction of arrow B, drive roller 110 and idler roller 112 pinch the leading edge of check 108 to direct the check between strike plate 114 and guide plate 116. Strike plate 114 includes a downwardly curving lip 118, and guide plate 116 has an upwardly curving lip 120 to ensure correct placement of the leading edge of check 108 between the plates. Print head 106 is vertically mounted in printer assembly 96 and is controlled by print motor 122 which directs print head 106 transversely across the face of check 108. Print head 106 intermittently contacts print ribbon 124 to imprint check information on the face of check 108. A second guide plate 126 is positioned opposite a portion of strike plate 114 to direct check 108 through an exit slot in base member 128. Again, printer assembly 96 is powered by a power source 128, such as a replaceable, rechargeable battery.

It is to be understood that printer assembly 60 of FIG. 4 may be oriented so that checks are withdrawn from the bottom of stack 54. Likewise, the printer assembly 96 of FIG. 6 may be arranged so that the topmost check of stack 98 is fed past print head 106.

In another aspect of the invention, a continuous web of checks attached end-to-end may be fed past the printer assembly of the subject electronic calculator to, for example, print payroll checks. Checks may be inserted through cover plate 62 and supported by either vertically displaceable plate 68, which would be in an upwardly biased position, or stationary flat plate 100. In this embodiment, checks are fed past a print head by a drive roller/idler roller combination to exit through a slot fashioned in the base member. Alternatively, a series of transversely mounted drive roller/idler roller combinations may replace plate 68 or 100 to feed checks past the print head.

After reading and understanding the foregoing electronic checkbook, in conjunction with the drawings, it will be appreciated that several distinct advantages of the subject invention are obtained.

Without attempting to set forth all of the desirable features of the instant electronic checkbook, at least some of the major advantages include the unique combination of a printer assembly having a check feed mechanism which operates in conjunction with a print head so that, as a check is being fed past the print head, check information data is printed on the check face. In this manner, the subject electronic checkbook is able to expeditiously and efficiently print checks for disbursement.

In addition, the subject invention includes a display screen dimensioned to depict a full check face format which allows a user to verify that all entered check information is correct prior to printing the check in final.

In describing the invention, reference has been made to a preferred embodiment and illustrative advantages of the invention. Those skilled in the art, however, and familiar with the instant disclosure of the subject invention, will recognize additions, deletions, modifications, substitutions, and other changes which will fall within the purview of the subject invention and claims.

What is claimed is:

1. An electronic checkbook for electronically viewing, printing, and registering checks comprising:
    a base member;
    data entry means for entering alpha-numeric data into said electronic checkbook;
    print means for printing check information data on the face of a check, said print means including a mobile print head moveable in a direction transverse to the face of a check to be printed;
    check feed mechanism for feeding individual checks past said print means, said check feed mechanism operating in conjunction with said print means so that, as the check is being fed past said print means, said print means concomitantly prints data on the face of the check; and
    computer means electrically communicating with said data entry means, said print means, and said check feed mechanism to receive, store, and retrieve data entered into said data entry means and to cooperatively drive said print head and said check feed mechanism to produce alpha-numeric printed matter on the face of the check.

2. An electronic checkbook as defined in claim 1 wherein:
    said base member is generally rectangular in shape and is dimensioned to store a plurality of checks.

3. An electronic checkbook as defined in claim 2 wherein:
    said base member stores the plurality of checks in a stacked arrangement.

4. An electronic checkbook as defined in claim 2 wherein:
    said base member has means to discharge individual checks into said check feed mechanism; and
    said check feed mechanism operably feeds individual checks to be printed in a longitudinal direction with respect to said base member.

5. An electronic checkbook as defined in claim 3 wherein said check feed mechanism comprises:
    at least one drive roller transversely mounted within said base member; and
    at least one idler roller positioned opposite said at least one drive roller such that an individual check to be printed is drawn between said at least one idler roller and said at least one drive roller for controlled advancement of the check to be printed with respect to said print head.

6. An electronic checkbook as defined in claim 5 wherein said check feed mechanism further comprises:
    at least one plate member configured to support and guide an individual check to be printed past said print means.

7. An electronic checkbook as defined in claim 6 wherein said check feed mechanism further comprises:
    a check advancement roller transversely mounted in said base member and operable to push a check to be printed from the plurality of checks into engagement with said at least one drive roller and said at least one idler roller.

8. An electronic checkbook as defined in claim 1 and further comprising:
    display means attached to said base member for visually displaying data.

9. An electronic checkbook as defined in claim 2 and further comprising:
    display means pivotally connected to a long side of said generally rectangular base member for visually displaying data.

10. An electronic checkbook as defined in claim 9 wherein said pivotal attachment comprises:
    a link mechanism having a first end connected to a lower portion of said base member and a second end connected to said display means for providing a compound pivot connection between said base member and said display means.

11. An electronic checkbook as defined in claim 10 wherein:
    said display means is operable to rotate and pivot about said link mechanism so that a screen surface of said display means may be flush with an upper surface of said base member in a closed position.

12. An electronic checkbook as defined in claim 10 wherein:
    said display means is operable to rotate and pivot about said link mechanism to a position such that said display means is substantially coplanar with the bottom surface of said base member in an open operative position.

13. An electronic checkbook as defined in claim 9 wherein:
    said display means comprises a visual display screen dimensioned to depict a full check face format for permitting simultaneous visual verification of check information data for any single check.

14. An electronic checkbook as defined in claim 1 wherein:
    said data entry means is positioned on an upper surface of said base member and comprises an alpha-numeric keyboard.

15. An electronic checkbook as defined in claim 1 and further comprising:
    input/output means for permitting electronic communication between said computer means of said electronic checkbook and external computer means.

16. An electronic checkbook as defined in claim 1 and further comprising:
- a microphone for receiving audio signals from an external source;
- voice recognition means to input said audio signals into said data entry means.

17. An electronic checkbook for electronically viewing, printing, and registering checks comprising:
- a base member for storing a plurality of checks, said base member having a means for permitting exit of individual checks from said base member;
- data entry means for entering alpha-numeric data into said electronic checkbook;
- display means pivotally connected to said base member for visually displaying data, said display means including a visual display screen dimensioned to depict a full check face format for permitting simultaneous visual verification of entered check information data for any single check;
- print means for printing data on the face of a check corresponding to data displayed on said display means;
- check feed means for directing a check into proximity to said print means; and
- computer means electrically communicating with said data entry means, said print means, and said check feed means to print a check as depicted in full on said display screen.

18. An electronic checkbook as defined in claim 17 wherein:
- said display means includes cursor control keys for permitting control of cursor movement on said display screen.

19. A method for electronically viewing, printing, and registering checks comprising the steps of:
- receiving a check blank;
- entering data to be imprinted upon a single check blank into a data entry means;
- registering the entered data in a computer means, which electrically communicates with said data entry means, for subsequent retrieval;
- printing alpha-numeric data on the check blank; and
- simultaneously with said printing step, moving the check blank into position so that the check blank is printed with alpha-numeric data.

20. A method as defined in claim 19 wherein said printing step comprises:
- traversing the face of a check blank with a print head for printing data onto a check blank and concomitantly driving the check blank with respect to said print head to effect alpha-numeric printing of entered data onto the face of the check blank.

21. A method as defined in claim 19 wherein:
- prior to said printing step, visually verifying the entered data on a visual display screen dimensioned to depict a full check blank format.

* * * * *